(12) United States Patent
Sorice et al.

(10) Patent No.: US 11,739,583 B2
(45) Date of Patent: Aug. 29, 2023

(54) POWER MANAGEMENT FOR DOOR SYSTEM WITH HIGH AND LOW VOLTAGE ELECTRICAL POWER SUPPLIES FOR INTEGRATED ELECTRIC DEVICES AND METHODS OF OPERATION

(71) Applicant: Masonite Corporation, Tampa, FL (US)

(72) Inventors: Cory J. Sorice, La Grange, IL (US); Steven B. Swartzmiller, Batavia, IL (US); Alex Bodurka, Portage, MI (US)

(73) Assignee: MASONITE CORPORATION, Tampa, FL (US)

( * ) Notice: Subject to any disclaimer, the term of this patent is extended or adjusted under 35 U.S.C. 154(b) by 0 days.

(21) Appl. No.: 17/142,759

(22) Filed: Jan. 6, 2021

(65) Prior Publication Data

US 2021/0207421 A1   Jul. 8, 2021

Related U.S. Application Data

(60) Provisional application No. 63/087,526, filed on Oct. 5, 2020, provisional application No. 63/064,053, filed (Continued)

(51) Int. Cl.
*E05F 15/73* (2015.01)
*H02J 5/00* (2016.01)

(52) U.S. Cl.
CPC ............... *E05F 15/73* (2015.01); *H02J 5/00* (2013.01); *E05F 2015/763* (2015.01); *E05F 2015/767* (2015.01)

(58) Field of Classification Search
CPC ............... E05F 15/73; E05F 2015/763; E05F 2015/767; H02J 5/00; H02J 9/061;
(Continued)

(56) References Cited

U.S. PATENT DOCUMENTS 6,924,730 B1 * 8/2005 Evans ....................... E06B 9/74
340/506
10,141,739 B1 * 11/2018 Davis ...................... H05B 45/37
(Continued)

FOREIGN PATENT DOCUMENTS

| CN | 205876102 U | 1/2017 |
|---|---|---|
| KR | 101201194 B1 | 11/2012 |
| WO | 2013065550 A1 | 5/2013 |

OTHER PUBLICATIONS

International Search Report dated Mar. 4, 2021—Corresponding PCT Application No. PCT/US2021/012326.

*Primary Examiner* — John W Poos
*Assistant Examiner* — Tyler J Pereny
(74) *Attorney, Agent, or Firm* — CANTOR COLBURN LLP

(57) ABSTRACT

A door system comprises a door frame adapted to be mounted within an opening, a door pivotally attached to the door frame, an AC/DC converter operably associated with the door frame, a DC electric device mounted to the door, at least one sensor mounted to the door frame or the door, and a power management controller configured to receive an input from the at least one sensor and send a command to the DC electric device. The AC/DC converter is configured to be electrically connected to an AC power unit disposed outside the door system. The DC electric device is electrically connected to the AC/DC converter.

29 Claims, 8 Drawing Sheets

Related U.S. Application Data on Aug. 11, 2020, provisional application No. 62/957,415, filed on Jan. 6, 2020.

(58) Field of Classification Search
CPC ..................... H02J 7/0042; E05B 2047/0068;
E05B 47/02; E05B 2047/0059
See application file for complete search history.

(56) References Cited

U.S. PATENT DOCUMENTS

| | | | |
|---|---|---|---|
| 11,373,471 B2* | 6/2022 | Anderson | G07C 9/00309 |
| 2003/0167693 A1* | 9/2003 | Mainini | E05F 15/63 |
| | | | 49/281 |
| 2005/0237214 A1 | 10/2005 | Sanchirico | |
| 2012/0267962 A1* | 10/2012 | Hanchett, Jr. | H02J 50/12 |
| | | | 307/104 |
| 2019/0345738 A1* | 11/2019 | McKibben | E05F 15/75 |

* cited by examiner

POWER MANAGEMENT FOR DOOR SYSTEM WITH HIGH AND LOW VOLTAGE ELECTRICAL POWER SUPPLIES FOR INTEGRATED ELECTRIC DEVICES AND METHODS OF OPERATION

CROSS-REFERENCE TO RELATED APPLICATION AND CLAIM TO PRIORITY

This application claims the benefit of U.S. Provisional Patent Application Ser. No. 62/957,415 filed Jan. 6, 2020, Ser. No. 63/064,053 filed Aug. 11, 2020 and Ser. No. 63/087,526 filed Oct. 5, 2020, all by Sorice et al., which are each hereby incorporated herein by reference in its entirety and to which priority is claimed.

BACKGROUND OF THE INVENTION

1. Field of the Invention

The present invention is directed to exterior or interior doors for residential or commercial buildings, such as for a home, apartment, condominium, hotel room or business, and more particularly to a door system having sources of low- and/or high-voltage electrical power and a power management system provided to operate electric devices mounted to or adjacent a door assembly. The invention also includes methods of operating the doors.

2. Description of the Related Art

Typical existing exterior or interior doors for residential or commercial buildings may have a number of electric devices (or components) mounted to the doors in order to provide desired functions, such as electronic access control, door state feedback, an entry camera and audio communication, an electric powered door latch, an electric powered door lock, etc. Also, the market for exterior and interior doors has seen an increasing adoption of additional electric devices including video doorbells, smart locks, LED lighting, smart glass, electromechanical door closers, wireless connectivity electronics, etc. Each of these discrete electric devices is an add-on to an existing door, functions with the existing door construction, and is powered separately with at least one battery that requires periodic replacement. Should the battery not be replaced, then the electric device will not operate.

Current electric devices are mounted to exterior or interior doors in a manner that can be unattractive and unpleasant to look at. The electric devices typically each have either one or more rechargeable battery packs or at least one non-rechargeable battery that must periodically be recharged or changed and have some type of weatherable housing that may not match the appearance of the door.

While the commercial market, e.g., multi-tenant and mixed-use housing, hospitality, office, etc., has developed electrified door entry systems with electric strikes and door controller technologies, the adoption into the residential market has been limited. Existing residential door construction techniques focus on stile and rail construction, and have not seen integration of power systems or integration of electric devices with an internal controller.

Therefore, the need exists for a door system and method designed for integration of electric devices into the door system, with power run to the door so electric devices and that power managed by a control system so that the devices may be easily integrated into and powered from a central power supply without adversely impacting structural integrity, insulation and/or acoustic performance, energy efficiency, and aesthetics of the door system. Thus, improvements that may enhance performance and cost of door systems with electric devices are possible.

BRIEF SUMMARY OF THE INVENTION

According to a first aspect of the present invention, there is provided a door system. The door system comprises a door frame adapted to be mounted within an opening, a door pivotally attached to the door frame, a power converter such as an AC/DC converter operably associated with the door frame, a DC electric device mounted to the door, at least one sensor mounted to the door frame or the door, and a power management controller configured to receive an input from the at least one sensor and send a command to the DC electric device. The AC/DC converter is configured to be electrically connected to an AC power unit disposed outside the door system. The DC electric device is electrically connected to the AC/DC converter and to the power management controller.

According to a second aspect of the present invention, there is provided a door assembly. The door assembly comprises a door frame adapted to be mounted within an opening, a door pivotally attached to the door frame, a power converter such as an AC/DC converter mounted to or adjacent the door frame and configured to be electrically connected to an AC power unit, a DC power distribution system mounted to the door or door frame and electrically connected to the AC/DC converter, a plurality of DC electric devices mounted to the door or door frame and electrically connected to the AC/DC converter through the DC power distribution system, and a power management controller electrically connected to the AC/DC converter and operably associated with the DC electric devices and configured for controlling operation thereof.

According to a third aspect of the present invention, there is provided an entryway. The entryway comprises a door frame mounted within an opening, a door pivotally attached to the door frame, an AC power supply operably associated with the door frame, a power converter such as an AC/DC converter operably associated with the door frame and electrically connected to an AC power unit operably associated with the door, a DC power distribution system mounted to the door or door frame and electrically connected to the AC/DC converter, a plurality of sensors operably associated with the entryway, a plurality of DC electric devices mounted to the door or door frame and electrically connected to the DC power distribution system, and a power management controller electrically connected to the AC/DC converter and operably associated with the DC electric devices and with the sensors and configured for controlling at least one of the DC electric devices in response to the sensors.

According to a further aspect of the invention, a method of operating an entryway, the method comprises the steps of providing a door frame within an opening. The door has an electric powered operating mechanism pivotally mounted to the door frame. A source of AC power is positioned proximate the door frame. AC power is converted such as by generating DC power by rectifying and reducing the voltage of the AC power, and supplying low-voltage DC power to the door. At least one DC electric device is positioned on the door. A power management controller is electrically connected to the AC/DC converter and operably associated with the DC electric devices and with the sensors for controlling supply of power thereto, for receiving data therefrom, and for transmitting operating signals thereto. The DC electric devices are controlled by the power management controller in response to the sensors. The DC electric devices are operated by the power management controller.

Other aspects of the invention, including apparatus, devices, methods, and the like which constitute parts of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENTS

Figure 1:
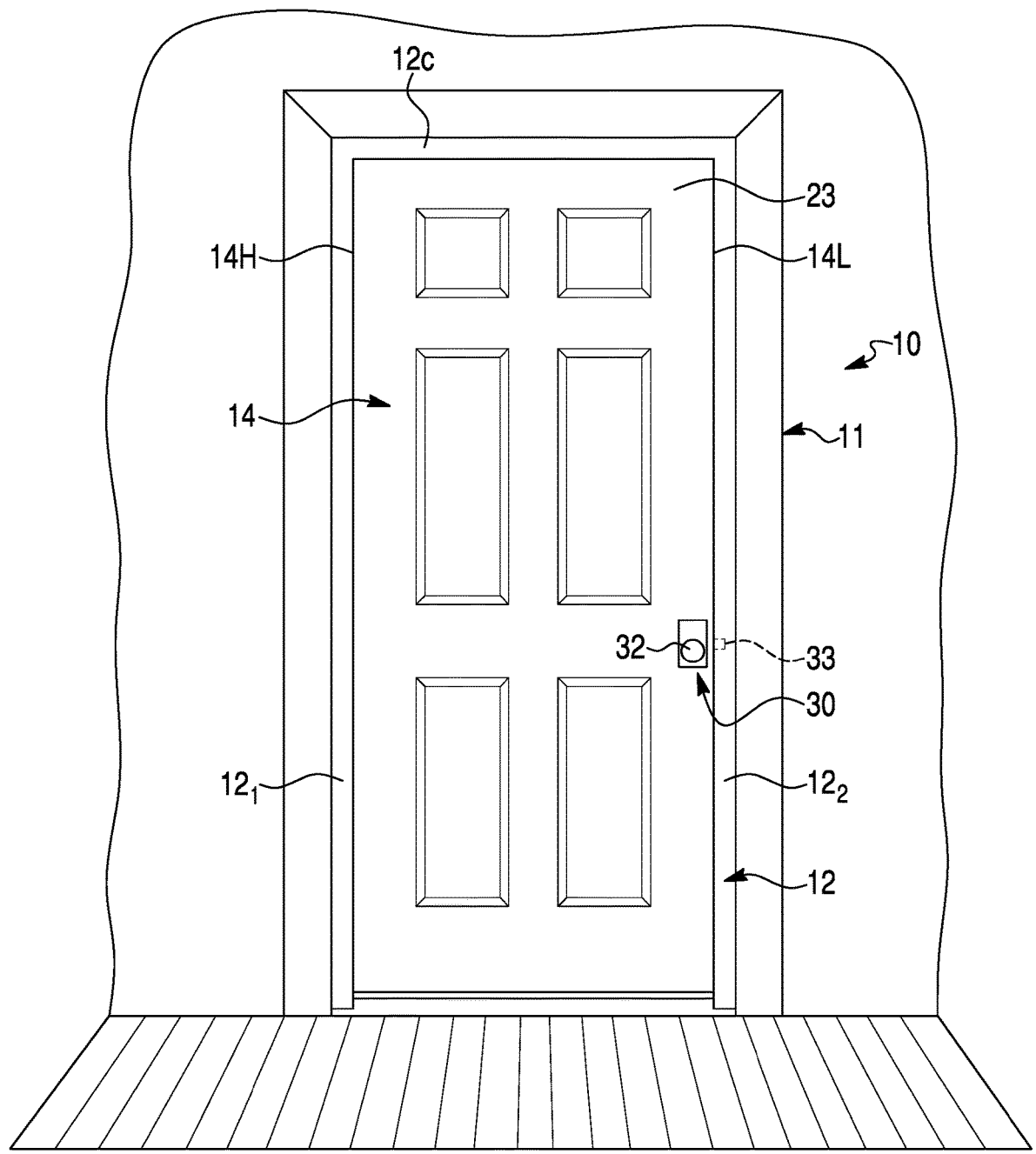
FIG. 1 is an elevational exterior view of an exterior door system according to a first exemplary embodiment of the present invention.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal," "vertical," "front," "rear," "upper", "lower", "top" and "bottom" as well as derivatives thereof (e.g., "horizontally," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

Figure 2:
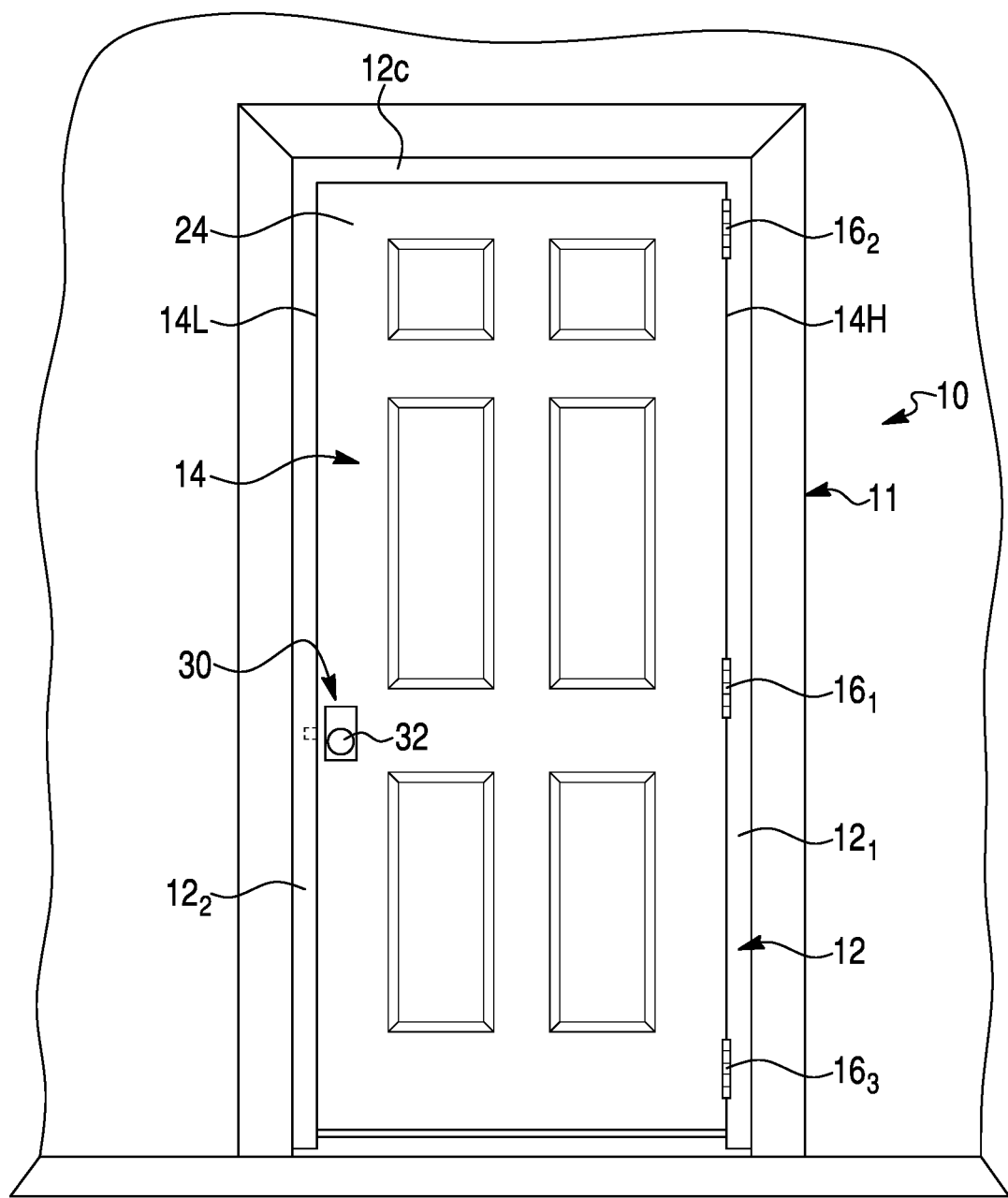
FIG. 2 is an elevational interior view of the door system according to the first exemplary embodiment of the present invention.

FIGS. 1 and 2 depict a door system 10 according to a first exemplary embodiment of the present invention, such as a pre-hung door. The door system 10 includes a conventional hinged residential exterior door assembly 11, but it should be understood that the door assembly 11 may be an exterior or interior door assembly having a pivotal door provided for a residential or commercial building, such as a home, apartment, garage, condominium, hotel, office building, or the like. The door assembly 11 may be made of any appropriate material, such as wood, metal, wood composite material, fiberglass reinforced polymer composite or the like. The door assembly 11 includes a substantially rectangular door frame 12 and a door 14 pivotally attached thereto by at least one hinge $16_1$, such as a "butt hinge" that includes two leaves.

The door frame 12 includes first and second parallel, spaced apart vertically extending jamb members $12_1$, $12_2$ and a horizontally extending upper jamb rail member or header 12c that connects upper ends of the first and second jamb members $12_1$, $12_2$. Those skilled in the art recognize that lower ends of the jamb members $12_1$, $12_2$ may be interconnected through a threshold $12_t$.

The at least one hinge $16_1$ pivotally attaches the door 14 to the first jamb member $12_1$. Typically, at least two hinges $16_1$ and $16_2$ are provided to secure the door 14 to the first jamb member $12_1$. Preferably, as best shown in FIG. 2, three hinges $16_1$, $16_2$, $16_3$ are used to secure the door 14 to the door frame 12. In the interest of simplicity, the following discussion will sometimes use reference numeral 16 without a subscript numeral to designate an entire group of hinges. For example, the reference numeral 16 will be sometimes used when generically referring to the hinges $16_1$, $16_2$ and $16_3$.

Figure 3:
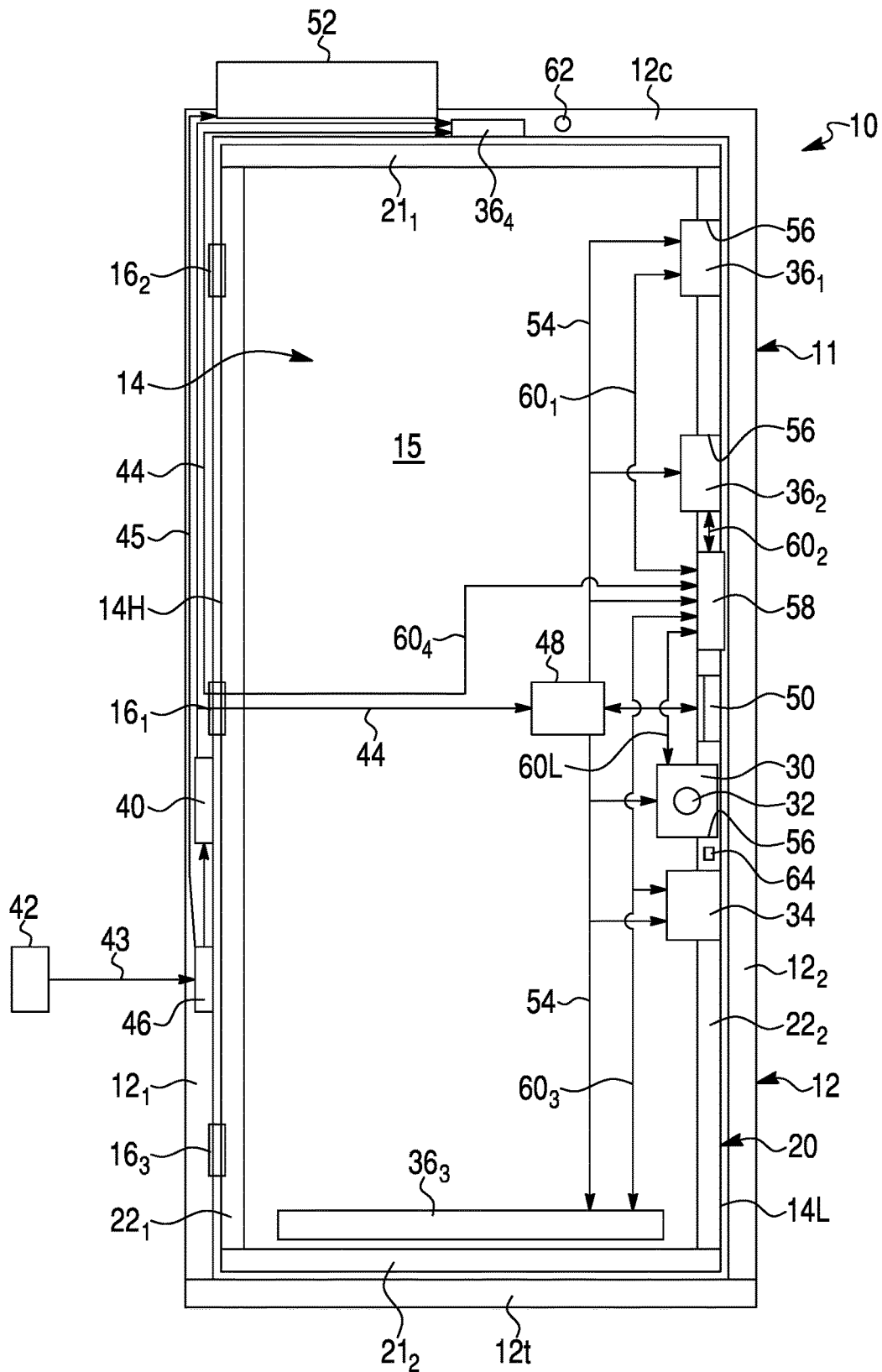
FIG. 3 is an elevational view of the door system according to the first exemplary embodiment of the present invention without an exterior door skin in order to allow observation of the interior of the door.

The door 14 includes a rectangular inner door frame 20, an exterior door skin (or facing) 23, and an interior door skin (or facing) 24 secured to opposite sides of the inner door frame 20, as best shown in FIGS. 1-3. The exterior and interior door skins 23 and 24 are formed separately from one another. The door skins 23 and 24 are secured, e.g., typically adhesively, to a suitable core and/or to opposite sides of the inner door frame 20 so that the inner door frame 20 is sandwiched between the exterior and interior door skins 23 and 24. Typically, the exterior and interior door skins 23 and 24 are identical in appearance and are made of a polymer-based composite, such as sheet molding compound ("SMC") or medium-density fiberboard (MDF), other wood composite materials, fiber-reinforced polymer, such as fiberglass, hardboard, fiberboard, steel, and other thermoplastic materials. The door 14 has a hinge side 14H mounted to the inner door frame 20 by the hinges 16, and a horizontally opposite latch side 14L.

The inner door frame 20 includes a pair of parallel, spaced apart horizontally extending top and bottom rails $21_1$ and $21_2$, respectively, and a pair of parallel, spaced apart vertically extending first and second stiles $22_1$ and $22_2$, respectively, typically manufactured from wood or an engineered wood, such as a laminated veneer lumber (LVL). The top and bottom rails $21_1$ and $21_2$ horizontally extend between the first and second stiles $22_1$ and $22_2$. Moreover, the top and bottom rails $21_1$ and $21_2$ may be fixedly secured to the first and second stiles $22_1$ and $22_2$, such as through adhesive or mechanical fasteners. The inner door frame 20 further may include a mid-rail extending horizontally and spaced apart from the top and bottom rails $21_1$ and $21_2$, respectively, and is typically also manufactured from wood or an engineered wood, such as a laminated veneer lumber (LVL). Moreover, the mid-rail may be fixedly secured to the first and second stiles $22_1$ and $22_2$. The hinges 16 are secured to the first stile $22_1$, which defines a hinge stile of the inner door frame 20.

The inner door frame 20 and the exterior and interior door skins 23, 24 of a typical door surround an interior cavity, which may be hollow or may be filled with, for example, corrugated pads, foam insulation, or other core materials, if desired. Thus, the door 14 may include a core 15 disposed within the inner door frame 20 between the exterior and interior door skins 23 and 24. The core 15 may be formed from foam insulation, such as polyurethane foam material, cellulosic material and binder resin, corrugated pads, etc. The core 15 enhances thermal resistance and noise attenuation, among other attributes.

The door system 10 comprises a number of DC (i.e., direct current) electric components (devices) mounted to the door 14 or adjacent the door 14 of the door system 10 to provide functions, such as electronic access control, door state feedback, entry camera and audio/video communication, etc. Specifically, the electric devices that may be mounted to the door 14 of the door system 10 include, but are not limited to, an electric powered door latch 30, an electric powered door lock 34, a video doorbell $36_1$, a digital camera $36_2$, a threshold LED light $36_3$ and a hallway illumination light with a motion detector (or motion sensor) $36_4$. Specifically, the electric powered door latch 30 and the electric powered door lock 34 are mounted to the inner door frame 20 of the door 14, while the video doorbell $36_1$, the digital camera $36_2$ and the threshold LED light $36_3$ may be mounted to the door frame 12 or to the door 14 of the door system 10, as best illustrated in FIG. 3. Alternatively, the video doorbell $36_1$, the digital camera $36_2$, the threshold LED light $36_3$ or the hallway illumination light w$36_4$ may be mounted to the door frame 12 or even adjacent to the frame 12 on a wall of the building. The threshold LED light $36_3$ and/or the hallway illumination light $36_4$ may illuminate when an authorized person is recognized or when a person approaches the door 14. Further, while we illustrate a single LED, the door system may include multiple LEDs, such as to illuminate the door system 10, to illuminate the electric powered lock, and to illuminate the door handle. Thus, three or more LEDs may be provided on or adjacent the door 14.

The DC electric devices $36_1$-$36_4$ typically are low-voltage DC electric devices operated by low-voltage DC electrical power. Low voltage direct current (DC) is known in the art as 50 volts (V) or less. Common low voltages are 5 V, 12 V, 24 V, and 48 V. Many DC electric devices operate at 5 volts DC. Low voltage is normally used for doorbells, video doorbells, garage door opener controls, heating and cooling thermostats, alarm system sensors and controls, outdoor ground lighting, household and automobile batteries. Low voltage (when the source is operating properly) will not provide a shock from contact. However, a high current, low voltage short circuit (automobile battery) can cause an arc flash and possible burns. It should be understood that the door system 10 according to the present invention may include other electric devices, as there are a number of electric devices marketed to be mounted to doors and provide functions such as electronic access control, door state feedback, entry camera and communication, etc. In the interest of simplicity, the following discussion will sometimes use a reference numeral without a subscript numeral to designate an entire group of the electric devices. For example, the reference numeral 36 will be sometimes used when generically referring to the electric devices $36_1$-$36_4$.

As best illustrated in FIGS. 1 and 2, the electric powered door latch 30 includes a powered central latch bolt 33 moveable between extended and retracted positions. As best illustrated in FIGS. 1-3, the electric powered door latch 30 is mounted to the latch side 14L of the door 14. Specifically, the electric powered door latch 30 is mounted to the second stile $22_2$, which defines a latch stile of the door frame 20. The electric powered door latch 30 may have a lighted door knob 32 and a lighted keyhole, which is illuminated when an authorized person is recognized or when a user approaches. The handle 32 is manually operable by a user to retract the central latch bolt 33 to allow opening of the door 14 from a closed position to an open position.

As further illustrated in FIG. 3, the electric powered door lock 34 is a deadbolt device, although other locking systems may be utilized. The electric door lock 34 includes a locking element in the form of a deadbolt operable between an extended or locked position, which prevents opening of the door 14, and a retracted or unlocked position, which allows opening of the door 14. As best illustrated in FIGS. 1-3, the electric powered door latch 30 and the electric powered door lock 34 are mounted to the latch side 14L of the door 14. Specifically, the electric powered door latch 30 and the electric powered door lock 34 are mounted to the second stile $22_2$, which defines a latch stile of the inner door frame 20.

Moreover, the door system 10 further includes an electric door operator (powered door closer) 52 associated with the frame assembly 12 and operably connected to the door 14. According to the first exemplary embodiment, the powered door closer 52 is mounted to the frame assembly 12. The door closer 52 has an articulating arm which has one end connected to a motor-carrying body attached to the header $21_1$ and another end engaged with door 14, so that operation of the motor of the motor-carrying body causes the arm to articulate and pivot the door 14 to the closed position. The electric powered door latch 30 and the electric powered door lock 34 are operated at low-voltage DC electrical power, while the electric door operator 52 is typically operated by AC electrical power, such as of 120 volts AC.

As illustrated in FIG. 3, the door system 10 further comprises an AC distribution unit 46 and a power converter, such as a low-voltage (such as 5 volts (V), 12 volts, 24 volts or other required voltage) AC to DC (AC/DC) converter 40, both mounted to the door frame 12. As best illustrated in FIG. 3, the low voltage AC/DC converter 40 is located in a pocket machined or otherwise formed into the first jamb member $12_1$ of the door frame 12, which is adjacent to the hinges 16 and the first stile of the door frame 20, i.e., adjacent to the hinge side 14H of the door 14. While we illustrate the AC/DC converter 40 located on the hinge jamb $12_1$, it may be located elsewhere on frame 12 or adjacent frame 12. The low voltage AC/DC converter 40 is electrically connected by high voltage wires 43 to a 120 (or 110)

V AC power unit 42 installed during home construction or located adjacent the door assembly 11. The AC/DC converter 40 can be located at a standardized height on the first jamb member $12_1$ of the door frame 12 so that the AC power unit 42 may be installed during home construction. Due to their close proximity, the AC/DC converter 40 and AC power unit 42 may be easily electrically connected. Alternatively, the low voltage AC/DC converter 40 may be disposed outside the door assembly 11, such as at the wall adjacent the door frame 12. The AC power unit 42 defines a source of high voltage (i.e., 120 (or 110) volts of a standard general-purpose alternating-current (AC) electrical power supply or a high voltage electrical power supply) disposed outside but adjacent the door system 10. Typically, the standard 120 (or 110) volts general-purpose AC electrical power supply is known in the USA as grid power, wall power, or domestic power. Other voltages, such as 220 volts, may be used. The low voltage AC/DC converter 40 after connection to AC power unit 42 converts the standard general-purpose alternating-current (AC) high voltage of 120 V to the low voltage of 5 volts DC, 12 volts DC, 24 volts DC, or other required voltage. Many electric devices operate at 5 volts DC or 12 volts DC, so the AC/DC converter 40 steps down the power and current type to allow typical 120 (or 115) volts general-purpose AC electrical power to be available for use at the door system 10.

The AC distribution unit 46 preferably is located in a pocket (or slot) 47 machined or otherwise formed into the first jamb member $12_1$ of the door frame 12, which is adjacent to the hinges 16 and the first stile of the door frame 20, i.e., adjacent to the hinge side 14H of the door panel 14. Alternatively, the AC distribution unit 46 may be located in a pocket (or slot) machined or otherwise formed into the upper jamb rail member header 12c of the frame assembly 12. Yet further, the AC distribution unit 46 may be disposed outside the door assembly 11, such as at the wall adjacent the frame 12. The AC distribution unit 46 is electrically connected to the 120 (or 115) V AC power unit 42 installed during home construction and located adjacent the door system 10. The AC distribution unit 46 also is electrically coupled to the low voltage AC to DC (AC/DC) converter 40. In this way, the 120 V AC power is distributed by the AC distribution unit 46 to the low voltage AC/DC converter 40 mounted in the door frame 12, and to at least one other electric device mounted into or on the frame assembly 12, such as the electric door operator 52, through a high-voltage supply wire 45, shown in FIG. 3.

The AC/DC converter 40 is electrically connected to the door 14 through an electric power transfer device. According to the present invention, a low voltage supply electrical wire(s) 44 runs from the low voltage AC/DC converter 40 to the electric power transfer device, such as one of the hinges $16_1$, $16_2$, $16_3$. Specifically, the low voltage supply electrical wire 44 runs to and through the hinge $16_1$ disposed usually in the middle of the first jamb member $12_1$ of the door frame 12 and provides an electric powered (or electric transfer) hinge that conducts the low voltage electrical power therethrough. The low voltage supply electrical wire(s) 44 transfers electrical power across or through the electric powered hinge $16_1$, which may be a McKinney Assa Abloy Electric Transfer Hinge with ElectroLynx® or the like. Other exemplary electrical hinges are disclosed in U.S. Pat. Nos. 3,860,312, 3,857,625, 3,842,386, 3,838,234, 3,355,695, 1,744,040, 615,209, 612,192 and US published patent application No. 2017/0306674, 2014/0213073, 2014/0001880, 2012/0073 083, the complete disclosures of which are incorporated herein by reference.

The supply electrical wire(s) 44 is connected to the powered hinge $16_1$ on the hinge side 14H of the door 14 and preferably runs through a horizontal supply channel to a DC power distribution system 48, such as provided by an electrical distribution block, located in or adjacent to a vertical supply passage on the latch side 14L of the door 14. The DC power distribution system 48 transmits low voltage DC power, data, electric signals, or a combination thereof. According to the first exemplary embodiment, the DC power distribution system 48 is disposed in a pocket (or slot) 49 machined or otherwise formed into the inner stile 223 of the second stile $22_2$ of the inner door frame 20. Electric power can be delivered from the DC power distribution system 48 to the electric devices 36, such as devices $36_1$ and $36_2$ that are mounted to the door 14, specifically into the latch stile $22_2$.

Low-voltage DC electrical power is delivered from the power distribution system 48 to the electric powered door latch 30 and the electric devices $36_1$-$36_3$ that are mounted to the door 14. Moreover, the low-voltage DC electrical power is delivered from the low-voltage AC/DC converter 40 directly to the low-voltage electric device $36_4$ that is mounted to the frame assembly 12 by the low-voltage supply wire 44 so as to bypass the DC power distribution system 48, as shown in FIG. 3.

A plurality of connecting electrical wires 54 extend through the vertical supply passage 25 and electrically connect the DC power distribution system 48 to the electric powered door latch 30, the electric powered door lock 34, and the electric powered devices $36_1$-$36_4$, thus electrically connecting the electric powered door latch 30, the electric powered door lock 34, and the electric devices $36_1$-$36_4$ to the low voltage AC/DC converter 40. Alternatively, electrical connectors may be pre-mounted in the vertical supply passage 25 at desired locations, so that the electric devices 36 may simply be inserted and plugged into electrical connectors. A standard flange size and plug location relative to location of a flange of the electric devices 36 may be set so that suppliers may supply electric devices that are easily plugged into the door 14. The supply electrical wire(s) 44 and the plurality of the connecting electrical wires 54 together define an electrical wire system, which is disposed within the door 14 and is electrically connected to the AC/DC converter 40 and to the DC electric device 30, 34 and 36.

In the event the electric devices 36 have connectors for connection to the DC power distribution system 48, the connectors may have a flange or some other unique identifier to mate with a complementary receptacle in order to identify or designate the connector and thus its electric device 36 as approved for use with the door system 10. Alternatively, the electric devices 36 may have an electronic signature or some other identifier to assure that the electric device 36 is approved for installation. A software handshake is another verification mechanism that may be utilized for electric devices 36. While plug connectors may be utilized to connect the electric devices 36, other forms of electrical connectors may be used while assuring transfer of power, data and operating signals.

The door 14 according to the first exemplary embodiment allows easy integration of the electric devices 36, while maintaining structural, insulation, noise attenuation, and aesthetic requirements of door 14. Moreover, according to the first exemplary embodiment, slots (or openings) 56, such as of up to 1" in width, may be machined into the latch stile $22_2$ to allow mounting of various electric devices, as best shown in FIG. 3. While we show slots 56 opening onto stile $22_2$, the slots 56 may open on the door facings 23, 24. The slots 56 open into the vertical supply passage 25. The connecting electrical wires 54 may be run to the DC power distribution system 48 or connectors may be pre-mounted to the inner stile 223 in the vertical supply passage 25, thus allowing the electric devices 36 to be plugged-in so that electric power can be supplied for use and functioning of the electric devices 36. Providing electric power to the door system 10 and the door 14 minimizes the need for changing batteries, thus assuring more reliable operation and functioning of the electric devices 36. Because the AC power is within the wall or the frame 12, only DC power is supplied to door 14 to minimize the possibility of an unintended electric shock.

As illustrated in FIG. 3, the door system 10 further includes a low-voltage back-up battery (or battery pack) 50 mounted to the door 14, such as to the inner door frame 20. The back-up battery 50 may slide into a pocket formed one of the stiles (e.g., the second stile $22_2$) of the inner door frame 20. The battery 50 is electrically connected to the DC power distribution system 48. The battery 50 has a low nominal voltage (such as 5 volts (V), 24 volts or other required voltage). The nominal voltage of the battery 50 corresponds to an output voltage of the low voltage AC/DC converter 40. The door system 10 is powered and operated by the electrical power of the battery 50 as a secondary back-up electrical power source for the powered door latch 30 and the electric devices $36_1$-$36_4$. Preferably, the battery 50 is also connected to the DC power distribution system 48 for back-up as well as to provide additional amperage for momentary, high amperage devices such as the powered door latch 30. Preferably, the battery 50 is a rechargeable battery that is charged from the DC power distribution system 48. Thus, in the door system 10, the reliance on batteries as a primary power source is less important, or if a battery option is used, a larger consolidated battery 50 may be stored in the door 14 and not in each of the electric devices.

As illustrated in FIG. 3, the door 14 of the door system 10 also includes a central electronic control unit (ECU) (or power management controller) 58 configured and programmed to receive input from one or more sensors, such as a motion sensor (or motion detector) 62 (in wireless or wired communication with central ECU 58), a proximity sensor, ambient light sensor, door state sensor, and a smoke detector. The ECU 58 sends commands to the electric devices $36_1$-$36_4$, the electric powered door latch 30, the electric power door lock 34, and also to the homeowner. The ECU 58 preferably is an electronic controller having firmware and/or associated software suitable for assuring operation of the ECU and its interaction with the electric devices 36 and associated sensors, if any. ECU 58 is in electrical communication with the various electric devices 36, receives data from the connected devices, and supplies operating signals to them.

The door 14 can be constructed with multiple prewired receptacles where electric devices and/or the battery can simply be plugged into an edge of the door 14 and a cover plate installed to enclose the electric devices. A housing for each of the receptacles can be molded from a flame retarded polymer that meets the necessary UL and regulatory requirements for housing electrical devices. The housing for each of the receptacles may be inserted into one of the slots 56 machined or otherwise formed into the latch stile $22_2$ of the door 14. Ventilation preferably is provided in the cover plate to aid in heat transfer, or a conduit may be connected to the receptacles and vent air out a top of the door 14. Preferably, the battery 50, the central ECU 58, the sensors, the electric powered door latch 30, the electric power door lock 34 and/or at least some of the electric devices are mounted into the edge of the latch side 14L of the door 14 in the prewired receptacles for integration, modularization, security, and serviceability. Alternatively, the power management controller 58 may be mounted to the door frame 12 or disposed outside the door assembly 11, such as at the wall adjacent the door frame 12.

The central ECU 58 controls the electric powered door latch 30, the electric power door lock 34 and the electric devices $36_1$-$36_4$. Accordingly, the central ECU 58 may be in communication with the electric powered door latch 30, the electric power door lock 34 and the electric devices $36_1$-$36_4$ through a data bus, via ethernet, CAN, or serial communication, which includes data links $60_1$, $60_2$, $60_3$, $60_4$ and 60L. As best shown in FIG. 3, the data link $60_4$ extends through the powered hinge $16_1$. Alternatively, the central ECU 58 may be in communication with the electric powered door latch 30, the electric power door lock 34 and the electric devices $36_1$-$36_4$ through one of the following wireless technologies: Bluetooth®, NFC, Zigbee, Zwave, Wi-Fi, LAN, mobile telecommunications technology (3G, 4G or 5G), etc.

The central ECU 58 also controls the electric powered door latch 30. The electric powered door latch 30 includes an electric latch operator, which may be used to lock the door 14 based upon input signals received from the central ECU 58. The central ECU 58 may allow the electric powered door latch 30 to be unlatched remotely, such as through a smartphone app, without the intervention of a person wishing to enter the building. To unlatch the door 14, the electric latch operator moves the central latch bolt 33 of the electric powered door latch 30 by an electric motor associated with the electric latch operator of the electric powered door latch 30 into the retracted position. Thus, the power management controller 58 with the data links $60_1$, $60_2$, $60_3$, $60_4$ and 60L defines a power management system for the door system 10.

The power management controller 58 may be adapted and configured for communication with a remotely located controller, such as available through a smartphone app, for operating at least one of the DC electric devices 30, 34 and 36 in response to a command from the remotely located controller.

The door system 10 can be configured by a user to enable both local and cloud integration and data storage. Specific examples where a user can configure setting of the door system 10 include:

using motion, ambient light, or door state sensors to turn on LED lighting, such as the threshold LED light $36_3$ or the hallway illumination light $36_4$;

using motion, ambient light, or door state sensors to control the electric powered door latch 30 and/or the electric power door lock 34;

using connected door lock sensors and video sensors to detect a user to unlock the door 14;

using door state sensor changes to activate home automation sequences, such as turning on interior lighting or for an announcement of occupancy; and using motion or ambient light sensors as a trigger for a smart glass of the door 14 to turn opaque for privacy and solar light management.

Those skilled in the art will recognize that the sensors communicating with the ECU 58 may be located on the building, the door frame 12 and/or the door 14 provided they are in communication with the ECU 58.

Also, the ECU 58 may notify a user that securing the door latch 30 is not possible due to the door 14 being ajar or open. For this purpose, the door assembly 10 may have a door state sensor (or door sensor) 64 communicating with the central ECU 58 via a wired or wireless connection, as best shown in FIG. 3. The door state sensor 64 monitors if the door 14 is ajar or closed (i.e., if the door 14 is properly aligned with the frame assembly 12) prior to activating the electric powered door latch 30. A signal from the door state sensor 64 indicating that the door 14 is ajar is directed to the ECU 58 that, in turn, activates the electric door operator 52 to properly close the door 14. Operation of electric powered latch 30 when the door 14 is not properly closed may damage the latch 30. Similarly, one or more sensors may be provided to not only turn-on the LED light(s) but allow the electric powered door lock to lock after determining that the individual has passed through the door 14 and the door 14 is closed, to communicate with a smartphone app to allow the owner to monitor activity around the door 14, to determine the status of the door 14, whether open or closed, and to determine whether someone is approaching the door 14.

Moreover, the door system 10 comprises the powered door closer (or electric power door operator) 52 mounted to the frame assembly 12 and operated by high voltage AC electrical power at 120 volts, and the door state sensor 64 (in wireless or wired communication with the central ECU 58) configured to determine the state of the door 14 (open or closed). Alternatively, the electric door operator 52 may also operate at low-voltage DC electrical power. According to the present invention, the AC powered door closer 52 and the door state sensor 64, such as a Hall-effect sensor, interact to close the door 14 when the door state sensor 64 determines that the door 14 is open. It should be understood that capabilities of the door state sensor 64 may contemplate various "states" of the door or the door devices, i.e., locked/unlocked, open/closed, lights on/off, etc. Other sensors in the system can also be used to sense problems with the DC or AC electric devices themselves, for example, no WiFi or Bluetooth signal, too much power draw, not enough power draw, too hot, too cold, (for a back-up battery 50, for example), etc. The sensors 62, 64 and other sensors communicate signals to ECU 58, which then determines the action to take in response to the signals, and issues a command to the appropriate electric device 36. In this way, the door state sensor 64 may send a signal to ECU 58 that the door 14 is open, and the ECU 58 may issue a command to door closer 52 to operate to close the door 14. The door open signal may be communicated by the door state sensor 64, such as on a periodic basis, on a timed basis, and may be in response to an inquiry, such as from the owner through use of a smartphone app.

The ECU 58 may work both locally amongst the electric devices 36, as well as be supplemented by cloud integration for more advanced control while the user is away from the home controller. In the door system 10, a user may access the power system of the door system 10 via a wireless connection or a PC or mobile device, such as through a smartphone app, to set up, configure and manage one or more powered electric devices 36. Moreover, a user may access data and have user settable options for both addition of electric devices as well as the diagnostic health of the attached electric devices 36 and/or the battery 50 that would be a more efficient method to service issues occurred with the electric devices 36 and the battery 50. The smartphone app may be used to monitor activity around the door 14, to activate the electric powered door 30 lock to lock and unlock, and to determine the status of the door 14, whether open or shut.

Therefore, a pre-wired door assembly 10 according to the present invention includes a power system and a door power management system and has the ability to provide both high-voltage and low-voltage electrical power for operation of a plurality of electric devices and a power management controller integrated into the door assembly 10. For the plurality of electric devices integrated in the door assembly 10, the range of watts required, considering amperes and volts specifically required by each of the electric devices and use, varies widely from LED lighting at the low end, 2.9 watts per foot at 5 volts, to electromechanical door systems requiring extremely high amp output to move a door, typically over 500 watts at 120 (or 115) volts. Thus, the present invention provides two or more power supply options that better match power needs of electric devices to allow for easier integration and power management given the diversity of power requirements.

Figure 4:
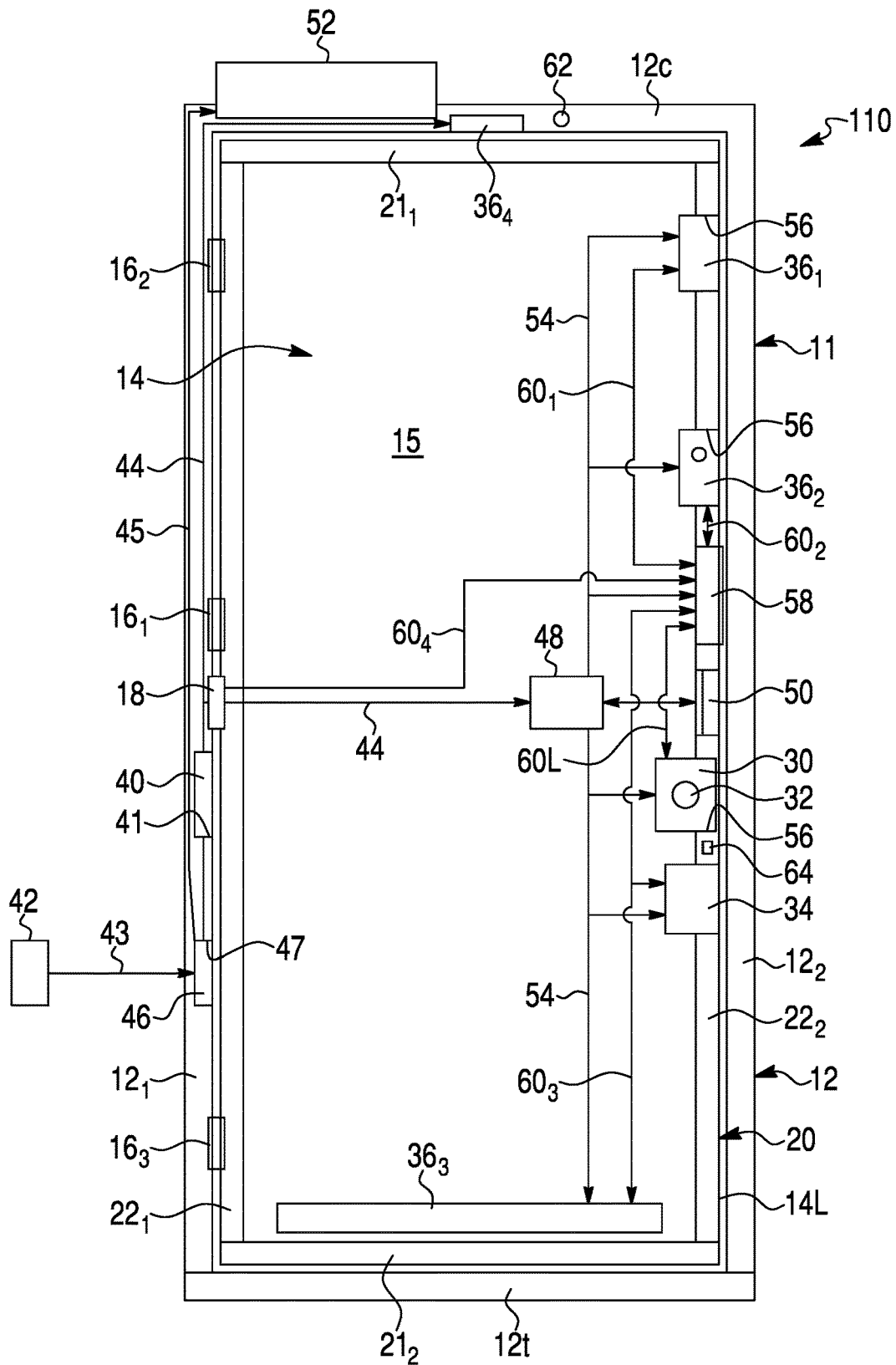
FIG. 4 is an elevational interior view of a door system according to a second exemplary embodiment of the present invention door system.

FIG. 4 illustrates a door system, generally labeled with the reference numeral 110, according to a second exemplary embodiment of the present invention. Components which function in the same ways as in the first exemplary embodiment of the present invention depicted in FIGS. 1-3 are labeled with the same reference characters. Components, which are constructed similar to or function in the same way as in the first exemplary embodiment are designated by the same reference numerals to which 100 has been added, sometimes without being described in detail since similarities between the corresponding parts in the two embodiments will be readily perceived by the reader.

As illustrated in FIG. 4, the door system 110 comprises a plurality of electric devices 36 integrated into a door assembly 111. Specifically, the electric devices that may be mounted to the door system 110 include, but are not limited to, an electric powered door latch 30, an electric powered door lock 34, a video doorbell $36_1$, a digital camera $36_2$, a threshold LED light $36_3$ and a hallway illumination light with a motion detector $36_4$, as best illustrated in FIG. 4. The electric powered door latch 30 and the electric powered door lock 34 are mounted to the inner door frame 20 of the door 14, while the video doorbell $36_1$, the digital camera $36_2$ and the threshold LED light $36_3$ may be mounted to the door frame 12 or to the door 14 of the door system 110. The threshold LED light $36_3$ may illuminate when an authorized person is recognized or when a person approaches the door 14. It should be understood that the door 14 of the door system 110 may include other electric devices, as there are a number of electric devices marketed to be mounted to doors and provide functions such as electronic access control, door state feedback, entry camera and communication, etc. Moreover, the electric devices $36_1$-$36_4$ are typically low-voltage DC electric devices operated by low voltage DC electrical power (such as 5 volts (V), 24 volts or other required voltage).

The AC/DC converter 40 is electrically connected to the door 14 through an electric power transfer device 18. According to the second embodiment of the present invention, a low voltage supply electrical wire(s) 44 runs from the low voltage AC/DC converter 40 to the electric power transfer device 18. The electric power transfer device 18 is disposed outside any of the hinges $16_1$, $16_2$, $16_3$ and is configured to transfer low voltage electrical power from the door frame 12 to the pivotable door 14. The low voltage supply electrical wire(s) 44 passes from the low voltage AC/DC converter 40 in the first jamb member $12_1$ of the door frame 12 to the pivotable door 14 bypassing any of the door hinges $16_1$, $16_2$, $16_3$. Exemplary electric power transfer devices are disclosed in U.S. Pat. Nos. 3,848,361, 4,445,299, 6,350,956, 6,812,407, 8,448,382, 8,505,169 and 9,825,443, the complete disclosures of which are incorporated herein by reference. Low voltage DC power is supplied to door 14 in order to minimize the possibility of electrical shock to a user. Further, the electric devices 36 typically are battery operated and thus operate on DC current at relatively low voltages, typically 5 V DC.

Figure 5:
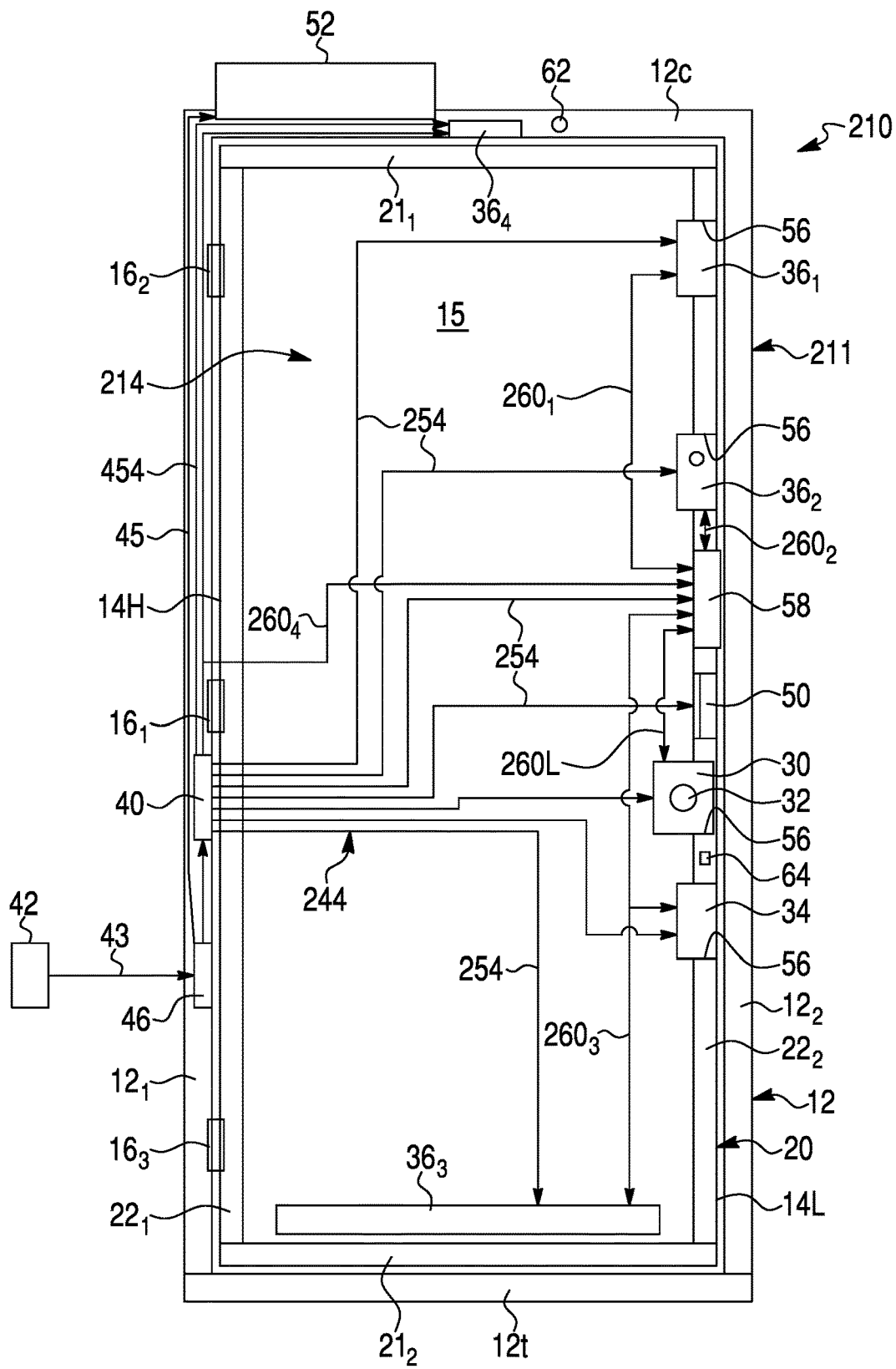
FIG. 5 is an elevational interior view of a door system according to a third exemplary embodiment of the present invention without an exterior door skin.

FIG. 5 illustrates a door system, generally labeled with the reference numeral 210, according to a third exemplary embodiment of the present invention. Components which function in the same ways as in the first exemplary embodiment of the present invention depicted in FIGS. 1-3 are labeled with the same reference characters. Components which are constructed similar to or function in the same way as in the first exemplary embodiment are designated by the same reference numerals to which 200 has been added, sometimes without being described in detail since similarities between the corresponding parts in the two embodiments will be readily perceived by the reader.

As illustrated in FIG. 5, the door system 210 comprises a plurality of DC electric devices 36 integrated into the door system 210. The electric devices that may be mounted to the door system 210 include, but are not limited to, an electric powered door latch 30, an electric powered door lock 34, a video doorbell $36_1$, a digital camera $36_2$, a threshold LED light $36_3$ and a hallway illumination LED $36_4$ with an integrated motion detector $36_4$ provided with a motion sensor (or motion detector) or a proximity sensor mounted to the frame assembly 12, as best illustrated in FIG. 5. The threshold LED light $36_3$ illuminates when a person approaches door 14. Some of the DC electric devices, such as the video doorbell $36_1$, the digital camera $36_2$, the threshold LED light $36_3$, may be mounted to the door frame 12 or to the door 214.

It should be understood that the door 214 of the door system 210 may include other electric devices, as there are a number of electric devices marketed to be mounted to doors and provide functions such as electronic access control, door state feedback, entry camera and communication, etc. Moreover, the electric devices 30, 34, $36_1$-$36_4$ typically are low-voltage DC electric devices operated by low voltage DC electrical power (such as 5 volts (V), 24 volts or other required voltage).

The AC/DC converter 40 is electrically connected to the door 214 by a plurality of low voltage connecting electrical wires 254 run from the low voltage AC/DC converter 40 to the electric power transfer device, such as one of the hinges $16_1$, $16_2$, $16_3$. The connecting electrical wires 254 together define an electrical wire system. According to the third exemplary embodiment, the electrical wire system is in the form of a wire harness 244 electrically connected to the AC/DC converter 40 to the DC electric devices 30, 34 and 36, and to ECU 58.

The central ECU 58 controls the electric devices, including the electric powered door latch 30 and the electric devices $36_1$-$36_4$. Accordingly, the central ECU 58 is in communication with the electric powered door latch 30, the electric power door lock 34 and the electric devices $36_1$-$36_4$ through CAN, ETHERNET, serial communication including data and/or signal links $260_1$, $260_2$, $260_3$, $260_4$ and 260L. As best shown in FIG. 5, the data links $260_4$ and 260L extend through the wire harness 244. Preferably, the data links are in the form of a data bus that provides transportation for data and/or control signals going both ways. Alternatively, the central ECU 58 is in communication with the electric powered door latch 30, the electric power door lock 34 and the electric devices $36_1$-$36_4$ through one of the following wireless technologies: Bluetooth®, zigbee, zwave, nfc, Wi-Fi, LAN, mobile telecommunications technology (3G, 4G or 5G), etc.

Figure 6:
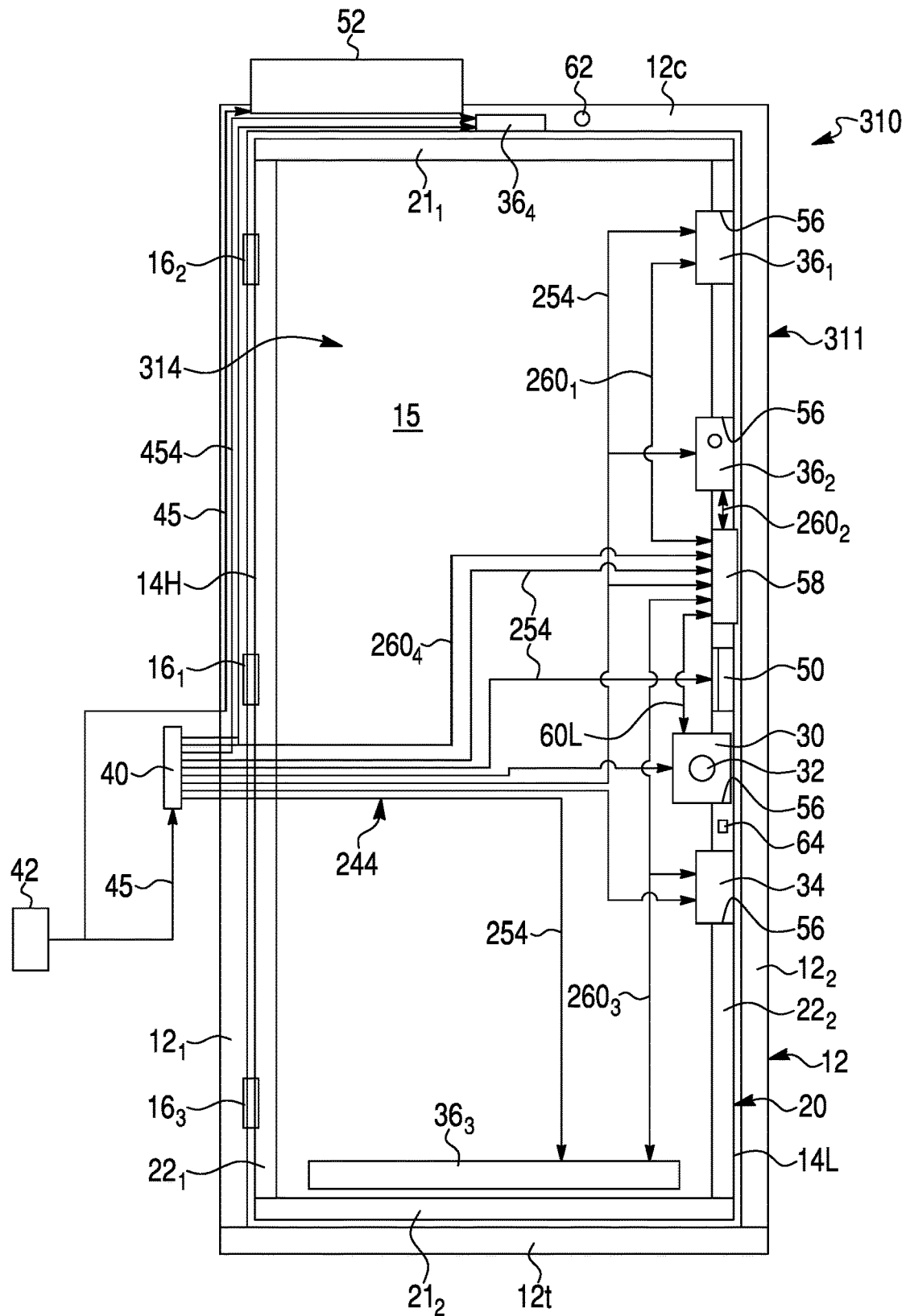
FIG. 6 is an elevational interior view of a door system according to a fourth exemplary embodiment of the present invention without an exterior door skin.

FIG. 6 illustrates a door system, generally labeled with the reference numeral 310, according to a fourth embodiment of the present invention. Components which function in the same ways as in the first exemplary embodiment of the present invention depicted in FIG. 5 are labeled with the same reference characters. Components, which are constructed similar to or function in the same way as in the first exemplary embodiment are designated by the same reference numerals to which 300 has been added, sometimes without being described in detail since similarities between the corresponding parts in the two embodiments will be readily perceived by the reader.

As illustrated in FIG. 6, the door system 310 comprises a plurality of DC electric devices 36 integrated into the door system 310. The electric devices that may be mounted to the door system 310 include, but are not limited to, an electric powered door latch 30, an electric powered door lock 34, a video doorbell $36_1$, a digital camera $36_2$, a threshold LED light $36_3$ and a hallway illumination light with a motion detector $36_4$ provided with a motion sensor (or motion detector) or a proximity sensor mounted to the frame assembly 12, as best illustrated in FIG. 6. The threshold LED light $36_3$ illuminates when a person approaches door 314. Some of the DC electric devices, such as the video doorbell $36_1$, the digital camera $36_2$, the threshold LED light $36_3$, may be mounted to the door frame 12 or to the door 314.

As illustrated in FIG. 6, the low voltage AC/DC converter 40 is disposed outside the door assembly 311, specifically outside the door frame 12. Moreover, the AC/DC converter 40 is electrically connected to the DC electric devices 30, 34 and 36 by a wire harness 244.

Figure 7:
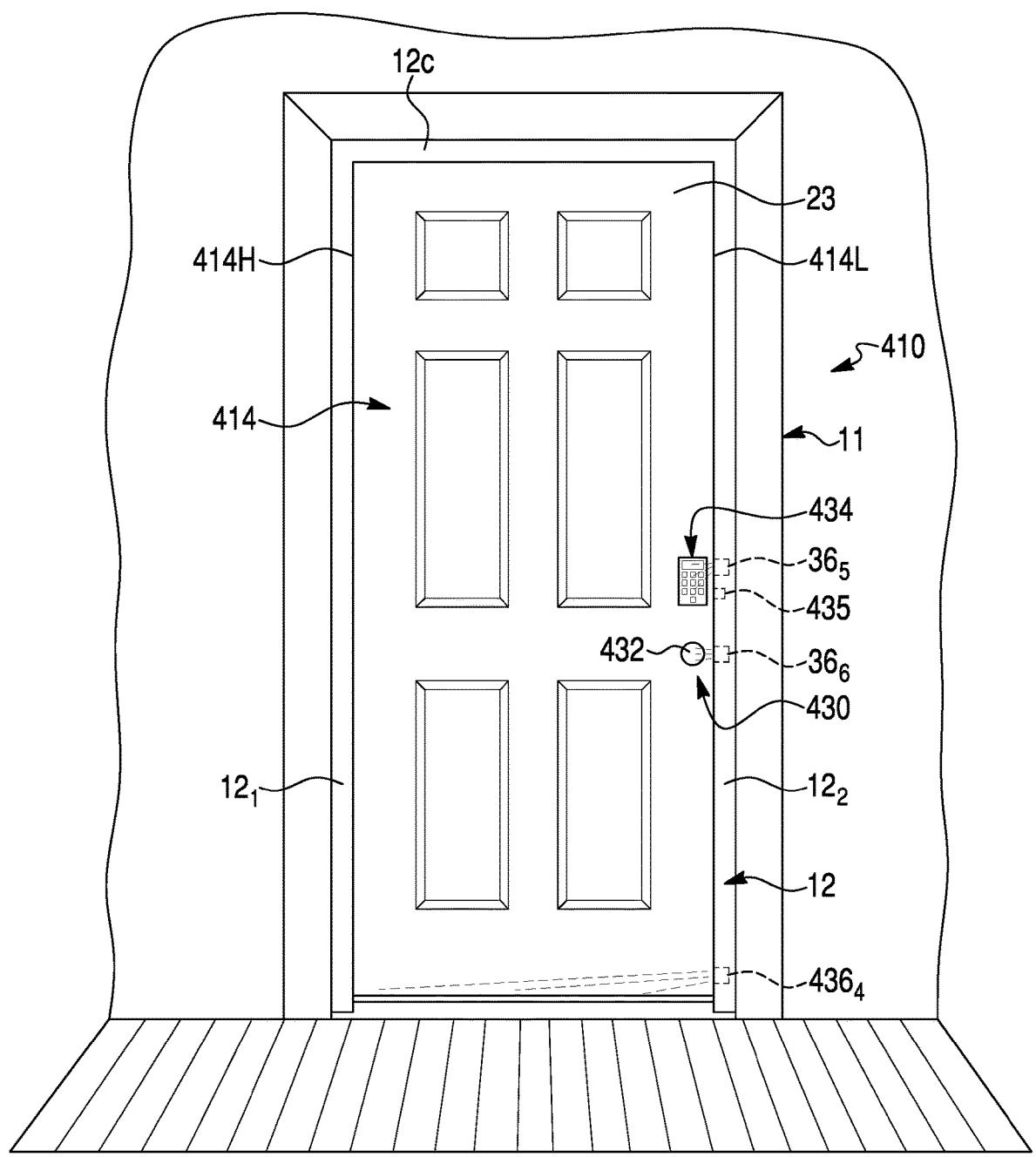
FIG. 7 is an elevational exterior view of an exterior door system according to a fifth exemplary embodiment of the present invention.
Figure 8:
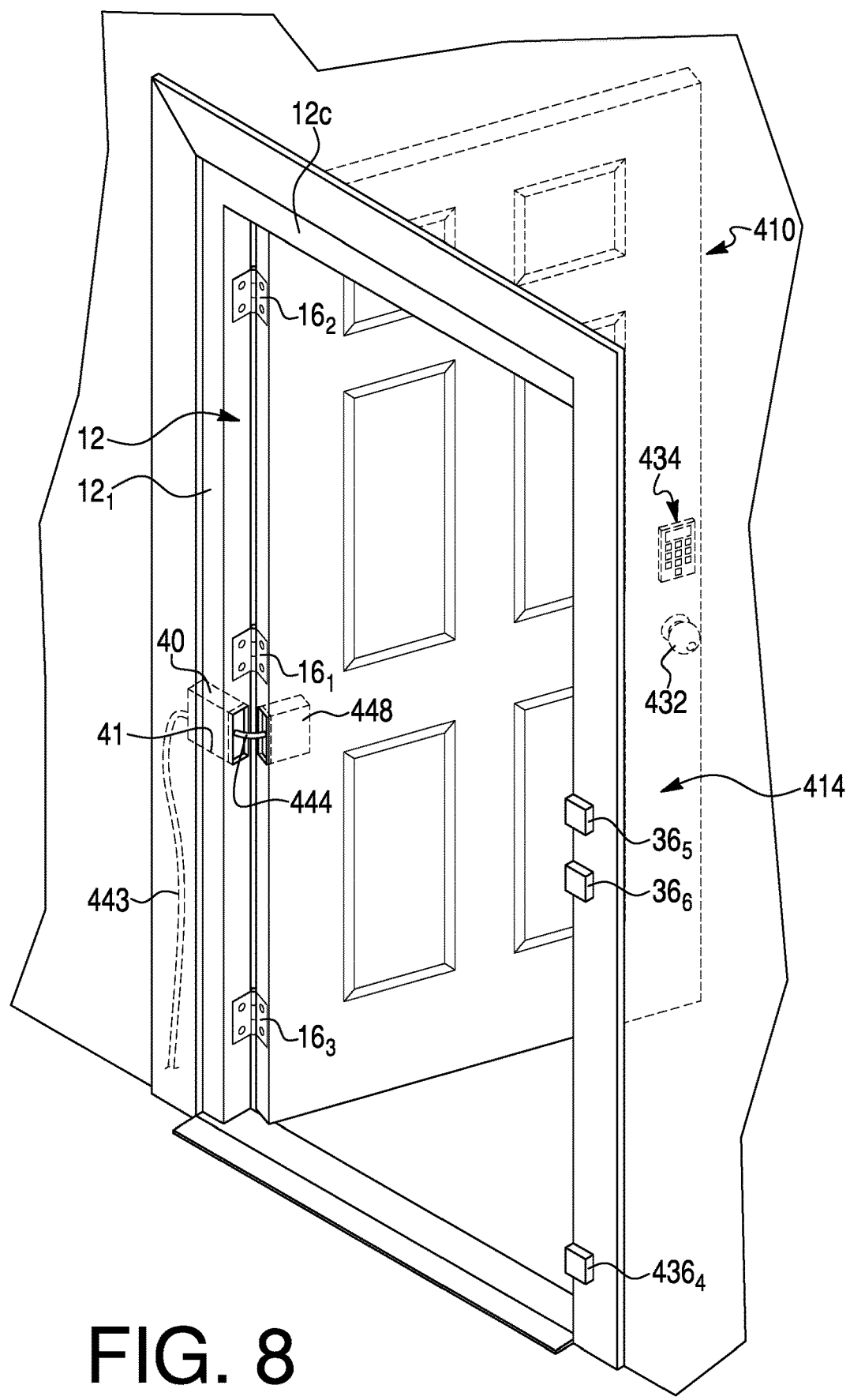
FIG. 8 is a perspective view of the exterior door system according to the fifth exemplary embodiment of the present invention with an open door.

FIGS. 7 and 8 illustrate a door system, generally labeled with the reference numeral 410, according to a fifth exemplary embodiment of the present invention. Components, which function in the same ways as in the third exemplary embodiment of the present invention depicted in FIG. 5 are labeled with the same reference characters. Components, which are constructed similar to or function in the same way as in the fifth exemplary embodiment are designated by the same reference numerals or by the reference numerals to which 200 has been added, sometimes without being described in detail since similarities between the corresponding parts in the two embodiments will be readily perceived by the reader.

As illustrated in FIGS. 7 and 8, the door system 410 comprises a substantially rectangular door frame 12 and a door 414 pivotally attached thereto by at least one hinge $16_1$, such as "butt hinge" that includes two leaves. Preferably, the door system 410 comprises three hinges $16_1$, $16_2$, $16_3$ used to pivotally attach the door 414 to the door frame 12. The door system 410 further comprises a plurality of DC electric devices (components) integrated into the door system 410. The DC electric devices are mounted to the door 414 or to the door frame 12 of the door system 410 to provide functions, such as electronic access control, door state feedback, entry camera and audio/video communication, etc. Specifically, the DC electric devices that are mounted to the door 414 of the door system 410 include, but are not limited to, a keypad electronic door lock 434 with a deadbolt 435, while the DC electric devices that are mounted to the door frame 12 or even adjacent to the frame 12 on a wall of the building include, but are not limited to, a threshold illumination light 4364, a door lock illumination light 365, and a doorknob illumination light 366 for illuminating a doorknob (or handle) 432 of a manual or electric powered door latch 430. While the lights 4364, 365, and 366 are shown mounted to the exterior of frame 12, they may be mounted in pockets formed into the frame 12 in order to be recessed and not easily accessible, such as to an intruder. Further, the lock pad 434 may be remote from door knob 432 or they may be integrated into a single unit.

As illustrated in FIG. 8, the door system 410 further comprises a low voltage (such as 5 volts (V), 12 volts, 24 volts or other required voltage) AC/DC converter 40 mounted to the door frame 12. Alternatively, the low voltage AC/DC converter 40 may be disposed outside the door assembly 411, such as at the wall adjacent the frame 12. According to the present invention, as best illustrated in FIG. 8, the low voltage AC/DC converter 40 is located in a pocket (or slot) 41 machined or otherwise formed into the first jamb member 12$_1$ of the door frame 12 so that the low voltage AC/DC converter 40 is accessible from outside of the first jamb member 12$_1$ and removably mounted in the pocket 41 to allow maintenance, for example. The low voltage AC/DC converter 40 is electrically connected by high voltage electrical cable(s) 643 to a 115 (or 120) V AC power unit which may be installed during home construction and located outside the door system 410.

Further as best shown in FIG. 8, the AC/DC converter 40 is electrically connected to a DC power distribution system 448 by an electric power transfer device including an armored cable 444 provided to transmit low voltage DC power, data, electric signals, or a combination thereof. Preferably the pockets in which the AC/DC converter 40 and the distribution system 448 are positioned are sized sufficiently to allow the armored cable 444 to be retained between them when the door 14 is closed and will not impede closing of door 414.

A door assembly according to the present invention includes a power system that has the ability to provide both high-voltage and low-voltage electrical power for operation of a plurality of electric devices integrated into the door assembly of the present invention. For the plurality of the electric devices integrated into the door assembly of the present invention, the range of watts required, considering amperes and volts specifically required by each of the electric devices and use, varies widely from LED lighting at the low end, 2.9 watts per foot at 5 volts, to electromechanical door systems requiring high amp output to move a door, typically over 500 watts at 120 volts. Thus, the present invention provides two or more power supply options that better match power needs of electric devices to allow for easier integration and power management given the diversity of power requirements.

In the door systems 10, 110, 210, 310 and 410 a user may access the power system of the door systems 10, 110, 210, 310 and 410 via wireless connection and a PC or mobile device, such as through a smartphone app, to set up, configure and manage one or more powered connected electric devices 36. The smartphone app may be used to monitor activity around the door, to activate the electric powered door lock 34 to lock and unlock, and to determine the status of the door, whether open or shut. Moreover, a user may access data and have user settable options for both addition of electric devices as well as the diagnostic health of the attached electric devices and/or the battery that would be a more efficient method to service issues with the electric devices and the battery.

By providing a convenient way to integrate the electric devices (hardware) into the door assembly with power available, manufacturers of the electric devices can simplify the designs and provide consumers with cleaner designs that are hidden and integrated into the door and do not require replacement of batteries. Furthermore, the invention enables integration of the electric devices into the door assembly in a standardized way that allows convenient serviceability of the electric devices.

The electric devices are integrated into the pre-wired door assembly according to the present invention so that the door maintains structural integrity, insulation performance, and is free of distortion or other aesthetic defects.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A door system, comprising:
a door frame adapted to be mounted within an opening;
a door pivotally attached to the door frame, the door including spaced stiles; an AC power source connected to the door frame;
an AC/DC converter disposed within a pocket formed in the door frame, the AC/DC converter electrically connected to the AC power source and outputting low voltage DC power;
at least one low voltage DC electric device mounted to the door and electrically connected through a wire to the AC/DC converter, the at least one low voltage DC electric device operable at a DC voltage of less than 50 volts DC, wherein at least one of the low voltage DC electric devices includes a verification mechanism configured to establish that the at least one of the low voltage DC electric devices is approved for the door;
at least one sensor mounted to the door; and
an electronic control unit mounted in one of the stiles and electrically wire connected to the AC/DC converter and configured to receive an input from the at least one sensor and to send a command and/or power to the at least one low voltage DC electric device; and
the at least one low voltage DC electric device is at least one of a doorbell, a video camera, and an illumination light.

2. The door system of claim 1, wherein the at least one sensor is mounted to the door and movable therewith.

3. The door system of claim 1, further comprising a battery, the battery operably associated with the power management controller and the at least one low voltage DC electric device in order to provide power thereto.

4. The door system of claim 3, wherein a plurality of low voltage DC electric devices are mounted to the door, each of the low voltage DC electric devices in electrical communication with the electronic control unit.

5. The door system of claim 4, further comprising a plurality of sensors, wherein each of the sensors is mounted to the door, and wherein each of the sensors is in communication with the electronic control unit.

6. The door system of claim 5, wherein at least one of the sensors is in wireless communication with the electronic control unit.

7. The door system of claim 5, wherein at least one of the sensors is in wired communication with the electronic control unit.

8. The door system of claim 4, wherein the low voltage DC electric devices are one of a video camera, a door lock, a LED, an illuminated key hole, and a door state sensor.

9. The door system of claim 3, wherein the battery is a rechargeable battery and the electronic control unit controls charging of the battery.

10. A door assembly, comprising:
a door frame adapted to be mounted within an opening;
a door pivotally attached to the door frame, the door having stiles and rails;
an AC/DC converter mounted within a pocket formed in the door frame and configured to be electrically connected through a wire to an AC power unit, the AC/DC converter configured to convert AC power of at least 110 volts AC to DC power of less than 50 volts DC;
a wired DC power distribution system located within the door and electrically connected through a wire to the AC/DC converter;
a plurality of low-voltage DC electric devices mounted to the door and electrically connected to the AC/DC converter through the wired DC power distribution system, wherein at least one of the low voltage DC electric devices includes a verification mechanism configured to establish that the at least one of the low voltage DC electric devices is approved for the door; and
an electronic control unit positioned within one of the stiles and electrically connected with the DC electric devices and configured for controlling operation and/or providing low voltage DC power thereto;
the low voltage DC electric devices operable at a DC voltage of less than 50 volts DC.

11. The door assembly of claim 10, wherein a power transfer device is connected to the AC/DC converter and adapted to be connected to the AC power unit.

12. The door assembly of claim 11, wherein the low voltage DC electric devices are selected from the group consisting of a video camera, a door lock, a LED, an illuminated key hole, and a door state sensor.

13. The door assembly of claim 10, further comprising a battery, the battery electrically connected to the electronic control unit for providing electric power thereto.

14. The door assembly of claim 13, wherein the battery is a rechargeable battery, and wherein the electronic control unit is configured to charge the battery.

15. The door assembly of claim 12, wherein at least a first sensor is adapted for operable association with the door and in communication with the electronic control unit, and wherein the electronic control unit is configured for operating at least one of the low voltage DC electric devices in response to a signal received from the first sensor.

16. An entryway, comprising:
a door frame mounted within an opening;
a door pivotally attached to the door frame, the door having stiles and rails;
an AC power source connected with the door frame;
an AC/DC converter disposed within a pocket formed in the door frame, the AC/DC converter electrically connected through a wire to the AC power source and outputting low voltage DC power of less than 50 volts DC;
a wired DC power distribution system located within the door and electrically connected through a wire to the AC/DC converter;
a plurality of sensors mounted to the door
a plurality of low-voltage DC electric devices mounted to the door and electrically connected to the DC power distribution system, the low voltage DC electric devices operable at a DC voltage of less than 50 volts DC, wherein at least one of the low voltage DC electric devices includes a verification mechanism configured to establish that the at least one of the low voltage DC electric devices is approved for the door; and
an electronic control unit mounted in one of the stiles and electrically wire connected to the AC/DC converter and configured to receive an input from each of the sensors and to send a command and/or power to at least one of the low voltage DC electric devices;
the at least one low voltage DC electric device is at least one of a doorbell, a video camera, and an illumination light;
the low voltage DC electric devices operable at a DC voltage of less than 50 volts DC.

17. The entryway of claim 16, wherein a power transfer device connects the AC power source to the AC/DC converter.

18. The entryway of claim 17, wherein the AC/DC converter is configured to reduce and convert the voltage of the electric power received from the AC power source.

19. The entryway of claim 18, further comprising a battery mounted to the door and electrically connected to the electronic control unit for providing electric power thereto.

20. The entryway of claim 17, wherein the electronic control unit is configured to provide electric power to the low voltage DC electric devices, to receive data from the sensors and the low voltage DC electric devices, and/or to provide control signals to the low voltage DC electric devices.

21. The entryway of claim 20, wherein at least one of the sensors is in wireless communication with the electronic control unit.

22. The entryway of claim 16, further comprising an AC-powered device operably associated with the door frame and connected to the door, wherein the AC-powered device is electrically connected to the AC power source.

23. The entryway of claim 22, wherein the AC-powered device is mounted to the door frame, and wherein the AC-powered device is adapted to close the door in response to a signal from the electronic control unit.

24. The entryway of claim 21, wherein the low voltage DC electric devices include at least one of a video camera, a door lock, a LED, an illuminated key hole, and wherein the sensors include a door state sensor.

25. The entryway of claim 21, further including a sensor mounted to the door frame.

26. The entryway of claim 25, wherein the electronic control unit is adapted and configured for communication with a remotely located controller for operating at least one of the low voltage DC electric devices in response to a command from the remotely located controller.

27. A method of operating an entryway, comprising the steps of:
- providing a door frame within an opening;
- positioning a source of AC power proximate the door frame;
- pivotally mounting a door to the door frame;
- converting the AC power to DC power of less than; 50 volts DC by rectifying and reducing the voltage of the AC power, and supplying low-voltage DC power to the door;
- positioning low voltage DC electric devices on the door, the low voltage DC electric devices operable at a DC voltage of less than 50 volts DC, wherein at least one of the low voltage DC electric devices includes a verification mechanism configured to establish that the at least one of the low voltage DC electric devices is approved for the door;
- mounting a plurality of sensors to the door;
- providing an electronic control unit electrically connected to the AC/DC converter and operably associated with the low voltage DC electric devices and with the sensors for controlling supply of power thereto;
- receiving data at the electronic control unit from at least one of the sensors or the at least one of the low voltage DC electric devices;
- transmitting operating signals or DC power to the low voltage DC electric devices from the electronic control unit in response to the sensors; and
- operating the low voltage DC electric devices in response to the output from the electronic control unit.

28. The door assembly of claim 10, wherein the verification mechanism includes a unique identifier to mate with a complementary receptacle in order to identify the at least one of the low voltage DC electric devices as approved for use with the door assembly.

29. The door assembly of claim 10, wherein the verification mechanism includes one of an electronic signature or a software handshake to assure that the at least one of the low voltage DC electric devices is approved for installation.

* * * * *